(12) United States Patent
Paek et al.

(10) Patent No.: US 6,307,994 B1
(45) Date of Patent: Oct. 23, 2001

(54) MULTI-CLADDING OPTICAL FIBER, LONG-PERIOD OPTICAL FIBER GRATING WRITTEN THEREIN AND WRITING METHOD THEREOF

(75) Inventors: Un-chul Paek, Kwangju; Kyung-hwan Oh, Seoul; Young-geun Han, Pusan, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/338,572

(22) Filed: Jun. 23, 1999

(30) Foreign Application Priority Data

Jun. 24, 1998 (KR) .................................................. 98-23921

(51) Int. Cl.[7] .................................................. G02B 6/02
(52) U.S. Cl. .............................................................. 385/127
(58) Field of Search ...................... 385/31, 147, 130–133

(56) References Cited

U.S. PATENT DOCUMENTS

| | | |
|---|---|---|
| 4,435,040 | 3/1984 | Cohen et al. . |
| 4,439,007 | 3/1984 | Lazay et al. . |
| 4,447,125 | 5/1984 | Lazay et al. . |
| 4,822,399 | 4/1989 | Kanamori et al. . |
| 5,411,566 | 5/1995 | Poole et al. . |
| 5,568,583 | 10/1996 | Akasaka et al. . |
| 5,673,354 | 9/1997 | Akasaka et al. . |
| 5,892,615 | 4/1999 | Grubb et al. . |

FOREIGN PATENT DOCUMENTS 0 622 343 A2  11/1994 (EP) .
0 702 252 A1  3/1996 (EP) .

(List continued on next page.)

OTHER PUBLICATIONS

Electronics Letters, vol., 34(3) (Feb 5, 1998), pp. 302–303.

Technical Report of The Institute of Electronics, Information and Communication Engineer, vol.97(539) (Feb. 1998), pp. 61–65.

*Primary Examiner*—Akm E. Ullah
(74) *Attorney, Agent, or Firm*—Robert E. Bushnell, Esq.

(57) ABSTRACT

A multi-cladding optical fiber, a long-period optical fiber grating written in the optical fiber, and a writing method thereof are provided. The multi-cladding optical fiber includes a core made of germanium-doped silica ($GeO_2$—$SiO_2$), for guiding light, an inner cladding made of fluorine-doped silica (F—$SiO_2$), the inner cladding having a refractive index smaller than that of the core and surrounding the core, and an outer cladding made of silica, the outer cladding having a refractive index smaller than that of the core and larger than that of the inner cladding and surrounding the inner cladding. Therefore, an optimized optical fiber can be designed. That is to say, an optical fiber having desired characteristics can be fabricated by adjusting at least one of the parameters including the amount of F doped into the inner cladding, the thickness of the inner cladding, the amount of $GeO_2$ doped into the core, the composition of $SiO_2$ in the outer cladding and the drawing tension of the optical fiber. Also, the refractive index of the core is periodically changed by periodically annealing the multi-cladding optical fiber, so that a stress-released long-period optical fiber grating can be obtained.

71 Claims, 6 Drawing Sheets

FOREIGN PATENT DOCUMENTS

| | | |
|---|---|---|
| 0 767 391 A2 | 4/1997 | (EP) . |
| 0 840 146 A1 | 5/1998 | (EP) . |
| 2065633A | 7/1981 | (GB) . |
| 2102146A | 1/1983 | (GB) . |
| 2118321A | 10/1983 | (GB) . |
| 56-62204(A) | 5/1981 | (JP) . |
| 56-121002(A) | 9/1981 | (JP) . |
| shou56-121002 | 9/1981 | (JP) . |
| 58-9103(A) | 1/1983 | (JP) . |
| 58-186702(A) | 10/1983 | (JP) . |
| shou58-186702 | 10/1983 | (JP) . |
| 6083004 | 5/1985 | (JP) . |
| 62153136 | 7/1987 | (JP) . |
| 6-345475(A) | 12/1994 | (JP) . |
| 7-333453(A) | 12/1995 | (JP) . |
| 8-81231(A) | 3/1996 | (JP) . |
| 8-136758 | 5/1996 | (JP) . |
| 8-136758(A) | 5/1996 | (JP) . |
| 8-313750(A) | 11/1996 | (JP) . |
| hei8-313750 | 11/1996 | (JP) . |
| 10-142412(A) | 5/1998 | (JP) . |
| hei10-142412 | 5/1998 | (JP) . |
| 11-38238(A) | 2/1999 | (JP) . |

MULTI-CLADDING OPTICAL FIBER, LONG-PERIOD OPTICAL FIBER GRATING WRITTEN THEREIN AND WRITING METHOD THEREOF

CLAIM OF PRIORITY

This application makes reference to, incorporates the same herein, and claims all benefits accruing under 35 U.S.C. §119 from my application MULTI-CLADDING OPTICAL FIBER, LONG-PERIOD OPTICAL FIBER GRATING FATTEN THEREIN AND WRITING METHOD THEREOF filed with the Korean Industrial Property Office on Jun. 24, 1998 and there duly assigned Ser. No. 23921/1998.

BACKGROUND OF THE INVENTION

1. Field of the Invention

The present invention relates to optical firs, and more particularly to long-period optical fiber gratings and methods of manufacture thereof.

2. Description of the Related Art

Long-period fiber gratings (LPFGs) have recently been attracting much attention for their possible applications such as gain-flattening filters for erbium-doped fiber amplifiers. Most LPFGs have been written in germanosilicate optical fibers because periodic structures can be easily obtained using UV-induced refractive-index changes due to the photosensitivity of Ge-related glass defects. This LPFG writing technique requires that fibers for LPFGs contain photosensitive sites, and thus the technique cannot be applied to those fibers which have no photo-reactive centers inside, such as pure-silica-core optical fibers.

In a general if fluorine is doped into a silica-core of a fiber, the refractive index of the core is reduced. Also, it is a matter of course that a stress is present during the preform stage, which is due to the difference between thermal expansion coefficients of the core and the cladding. If an optical fiber is formed by drawing the preform, stress is generated at the core and the refractive index thereof is reduced. In other words, a higher drawing tension leads to an increase in the tensile stress in the high viscosity core region, which is due to the photoelectric effect. By annealing the optical fiber, the residual stress can be easily released and the refractive index is restored to the level of that at the preform stage.

In fabricating a long-period optical fiber grating by annealing the optical fiber having the above-decribed configuration, in order to control the characteristics of the long-period optical fiber grating, the amount of fluorine (F) contained in the optical fiber, or the drawing tension of the optical fiber, is adjusted. However, it is not easy to obtain an optimum long-period optical fiber grating just by adjusting the amount of fluorine (F) contained in the optical fiber, or the drawing tension of the optical fiber.

In order to guide light through a core, the refractive index of the core must be higher than that of the cladding around the core. In another method for writing long-period optical fiber gratings in a conventional optical fiber, the long-period optical fiber grating is written such that an optical fiber comprised of a $N_2$-doped core and a cladding made of $SiO_2$, is annealed by arc discharge or $CO_2$ laser irradiation. However, according to this manufacturing method, since $N_2$ escapes from the core over a period of time, the reliability of the fiber grating may be degraded.

In a method for writing long-period optical fiber gratings in another conventional optical fiber, as discussed above, the refractive index of the core must be higher than that of the cladding around the core. The long-period optical fiber grating is written such that $H_2$ is injected into an optical fiber comprised of a $SiO_2$—$GeO_2$ core and a cladding made of $SiO_2$, and then a UV laser irradiates the fiber. However, according to this manufacturing method, the life time of the long-period optical fiber grating is not long and thus the reliability is not ensured.

Additional examples of optical fibers and long-period optical fiber gratings of the conventional art are seen in the following U.S. Patents. U.S. Pat. No. 4,435,040, to Cohen et al., entitled DOUBLE-CLAD OPTICAL FIBERGUIDE, describes a W-profile optical fiber with a core an inner cladding and an outer cladding, with the claddings being fluorine-doped. U.S. Pat. 4,822,399, to Kanamori et al., entitled GLASS PREFORM FOR DISPERSION SHIFTED SINGLE MODE OPTICAL FIBER AND METHOD FOR THE PRODUCTION OF THE SAME, describes a glass fiber preform with an inner core made of $GeO_2$—$SiO_2$ or $GeO_2$—F—$SiO_2$, an outer core made of F—$SO_2$, and a cladding made of F—$SO_2$. U.S. Pat. No. 5,568,583, to Akasaka et al., entitled DISPERSION COMPENSATING OPTICAL FIBER FOR WAVELENGTH MULTIPLEX TRANSMISSION AND METHOD USING SAME, describes an optical fiber with a W-shaped refractive index distribution, with a germanium-doped core, a fluorine-doped internal clad layer and a silica outermost clad layer. U.S. Pat. No. 5,673,354, to Akasaka et al., entitled DISPERSION COMPENSATING OPTICAL FIBER, also describes an optical fiber with a W-shaped refractive index distribution. The multi-cladded fibers of the above mentioned patents are designed for dispersion compensation, however, and their use in a long-period grating is not described. U.S. Pat. No. 5,892,615, to Grubb et al, entitled OUTPUT POWER ENHANCEMENT OPTICAL FIBER LASERS, describes an optical fiber with multiple claddings and further constructed with a core with a long period grating formed therein The long period grating is formed in the core using conventional techniques, and the above problems associated with conventional techniques obtain.

Based on our reading of the art, then, we have found that what is needed is a long-period optical fiber grating which is stable over a long time. Also, a method is needed for making a long-period optical fiber grating not relying on photoreactive sites in the core of the fiber.

SUMMARY OF THE INVENTION

It is therefore an object of the present invention to provide an improved long period fiber grating.

It is a further object of the present invention to provide a long period fiber grating which has long term reliability.

It is a yet further object of the present invention to provide a long period fiber grating without a $N_2$-doped core.

It is a still further object of the present invention to provide a method for making a long period fiber grating without using $H_2$ injection into the fiber.

It is another object of the present invention to provide a method for making a long period fiber grating without use of UV-light to change the refractive index of the fiber.

It is still another object of the present invention to provide a method for making a long period fiber grating using a fiber without photoreactive sites in the core.

To achieve the above objects, the present invention provides a multi-cladding optical fiber having a plurality of claddings and which can obtain desirable thermal and mechanical stress profiles by changing refractive index profiles of a core and claddings, a stress-released long-period optical fiber grating written in the multi-cladding optical fiber, and a method for writing a long-period optical fiber grating in the multi-cladding optical fiber.

Accordingly, to achieve the above objective, there is provided a multi-cladding optical fiber including a core made of germanium-doped silica ($GeO_2$—$SiO_2$), for guiding light, an inner cladding made of fluorine-doped silica (F—$SiO_2$), the inner cladding having a refractive index smaller than that of the core and surrounding the core, and an outer cladding made of silica, the outer cladding having a refractive index smaller than that of the core and larger than that of the inner cladding and surrounding the inner cladding.

According to another aspect of the present invention, there is provided a long-period optical fiber grating in which an optical fiber having a core and a cladding is periodically annealed and the refractive index of the core is periodically changed, wherein the optical fiber includes a core made of germanium-doped silica ($GeO_2$—$SiO_2$), for guiding light, an inner cladding made of fluorine-doped silica (F—$SiO_2$), the inner cladding having a refractive index smaller than that of the core and surrounding the core, and an outer cladding made of silica, the outer cladding having a refractive index smaller than that of the core and larger than that of the inner cladding and surrounding the inner cladding.

Alternatively, according to the present invention, there is provided a method for writing a long-period optical fiber grating, including the steps of (1) fabricating a multi-cladding optical fiber comprising a core made of germanium-doped silica ($GeO_2$—$SiO_2$), for guiding light, an inner cladding made of fluorine-doped silica (F—$SiO_2$), the inner cladding having a refractive index smaller than that of the core and surrounding the core, and an outer cladding made of silica, the outer cladding having a refractive index smaller than that of the core and larger than that of the inner cladding and surrounding the inner cladding, and (2) periodically changing the refractive index of the core of the multi-cladding optical fiber by periodically annealing the multi-cladding optical fiber fabricated in step (1).

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
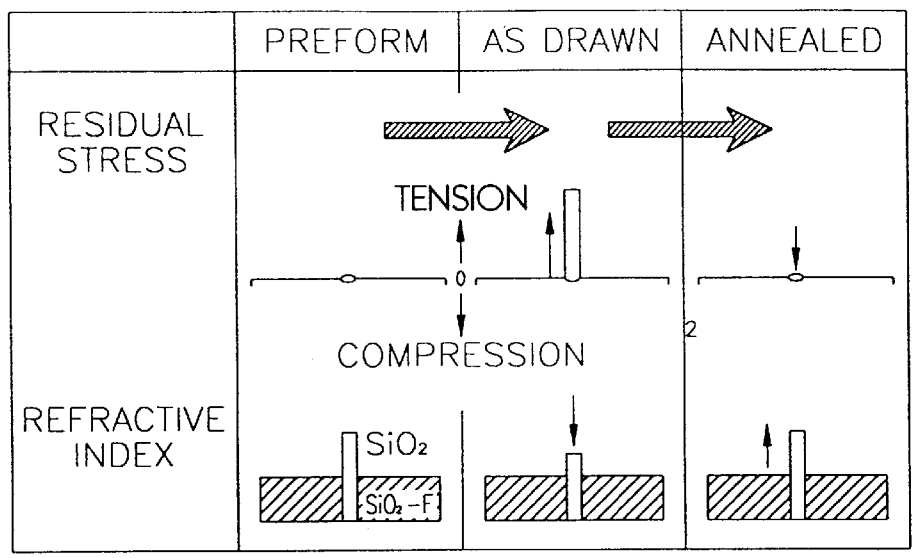
FIG. 1 illustrates a method for fabricating a general optical fiber.

Turning now to the drawings, the general methods of fabricating an optical fiber and conventional methods of writing long-period optical fiber gratings discussed above will be described with reference to the figures. FIG. 1 illustrates a method for fabricating a general optical fiber, which shows, in more detail, the relationship between residual stress and refractive index at a preform stage in the fabrication of the optical fiber, at a stage of the optical fleer as drawn and at a stage of the annealed optical fiber, respectively.

In general, if fluorine is doped into a silica-core, the refractive index of the core is reduced, resulting in the profile of the refractive index as shown. Also, it is a matter of course that a stress is present during the preform stage, which is due to the difference between thermal expansion coefficients of the core and the cladding. If an optical fiber is formed by drawing the preform, stress is generated at the core and the refractive index thereof is reduced. In other words, a higher drawing tension leads to an increase in the tensile stress in the high viscosity core region, which is due to the photoelectric effect. By annealing the optical fiber, the residual stress can be easily released and the refractive index is restored to the level of that at the preform stage.

In fabricating a long-period optical fiber grating by annealing the optical fiber having the above-described configuration, in order to control the characteristics of the long-period optical fiber grating, the amount of fluorine (F) contained in the optical fiber, or the drawing tension of the optical fiber, is adjusted. However, it is not easy to obtain an optimum long-period optical fiber grating just by adjusting the amount of fluorine (F) contained in the optical fiber, or the drawing tension of the optical fiber.

Figure 2:
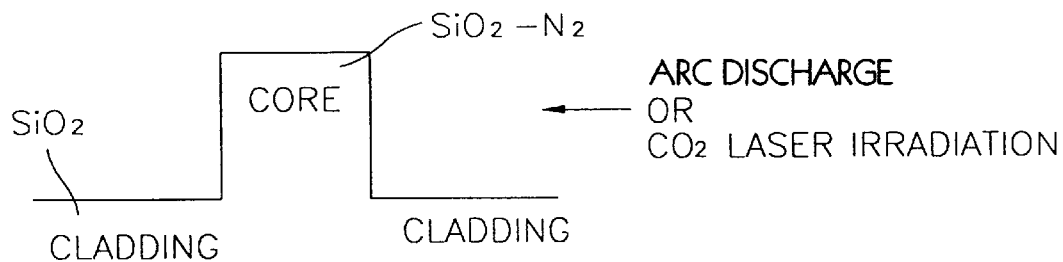
FIG. 2 illustrates a method for writing long-period optical fiber gratings in a conventional optical fiber.

FIG. 2 illustrates a method for writing long-period optical fiber gratings in a conventional optical fiber. In FIG. 2, in order to guide light through a core, the refractive index of the core must be higher than that of the cladding around the core. The long-period optical fiber grating shown in FIG. 2 is written such that an optical fiber comprised of a $N_2$-doped core and a cladding made of $SiO_2$, is annealed by arc discharge or $CO_2$ laser irradiation. However, according to this manufacturing method, since $N_2$ escapes from the core over a period of time, the reliability of the fiber grating may be degraded.

Figure 3:
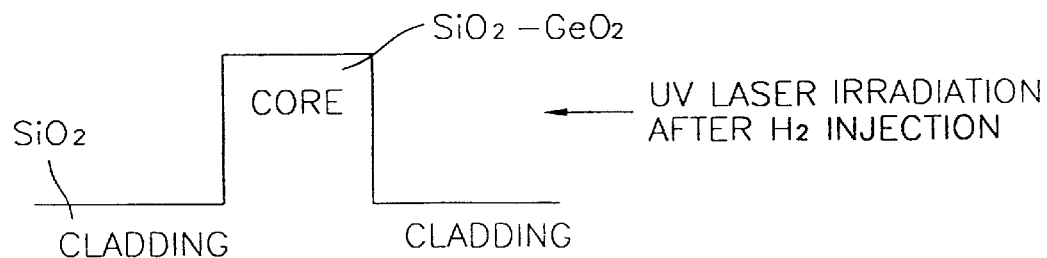
FIG. 3 illustrates a method for writing long-period optical fiber gratings in another conventional optical fiber.

FIG. 3 illustrates a method for writing long-period optical fiber gratings in another conventional optical fiber. In FIG. 3, as in FIG. 2, the refractive index of the core must be higher than that of the cladding around the core. The long-period optical fiber grating shown in FIG. 3 is written such that $H_2$ is injected into an optical fiber comprised of a $SiO_2$—$GeO_2$ core and a cladding made of $SiO_2$, and then a UV laser irradiates the fiber. However, according to this manufacturing method, the life time of the long-period optical fiber grating is not long and thus the reliability is not ensured.

Figure 4A:
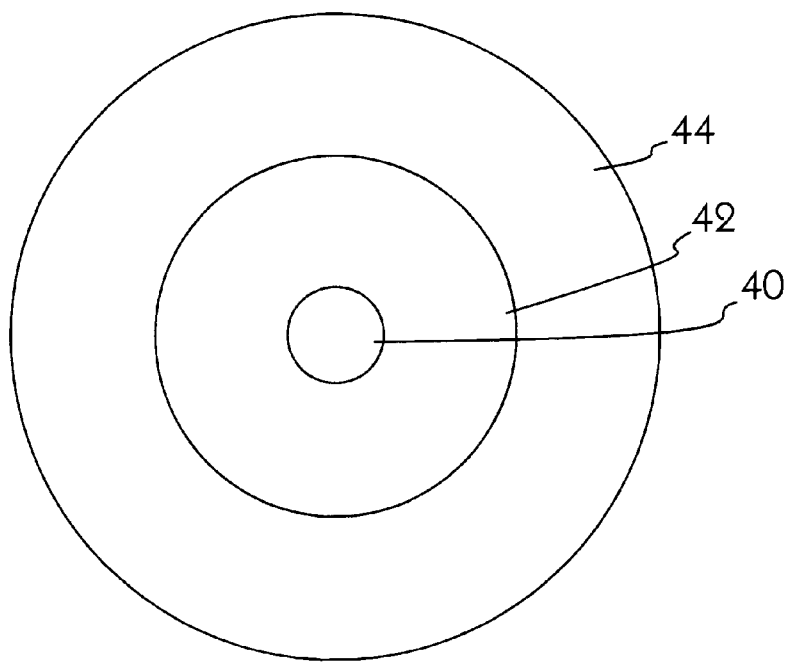
FIGS. 4A and 4B illustrate a cross-sectional view of a multi-cladding optical fiber according to the present invention, and a profile of refractive indices of the same.

Now, the present invention will be described in detail with reference to the accompanying drawings. FIG. 4A illustrates a cross-sectional view of a multi-cladding optical fiber according to the present invention. The multi-cladding optical fiber shown in FIG. 4A is comprised of a core 40, an inner cladding 42, and an outer cladding 44. The core 40 waveguides light and is made of germanium-doped silica ($GeO_2$—$SiO_2$). The inner cladding 42 surrounds the core 40 and is made of fluorine-doped silica (F—$SiO_2$). The outer cladding 44 surrounds the inner cladding 42 and is made of silica.

Figure 4B:
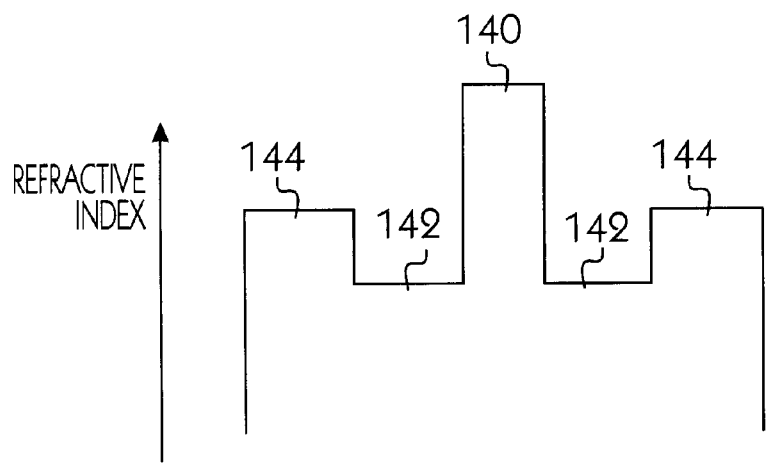

FIG. 4B illustrates a profile of refractive indices of the multi-cladding optical fiber shown in FIG. 4A. As shown in FIG. 4B, the refractive index 142 of the inner cladding 42 is lower than the refractive index 140 of the core 40. Also, the refractive index 144 of the outer cladding 44 is lower than the refractive index 140 of the core 40, and is higher than the refractive index 142 of the inner cladding 42.

FIGS. 5 through 10 are drawings showing parameters affecting the characteristics of an optical fiber in fabricating a multi-cladding optical fin according to the present invention, and explaining the influences exerted by the parameters.

Figure 5:
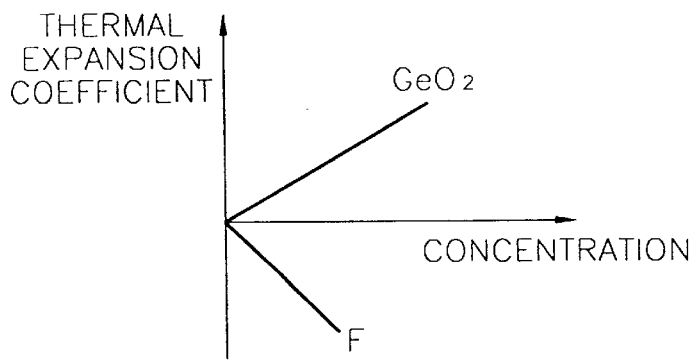
FIG. 5 illustrates the dependency of the thermal expansion coefficients of germanium oxide ($GeO_2$) and fluorine (F) doped thereinto on dopant concentrations.

FIG. 5 illustrates the dependency of the thermal expansion coefficients of germanium oxide ($GeO_2$) and fluorine (F) on their concentrations, respectively. As shown in FIG. 5, as the $GeO_2$ and F concentrations increase, the thermal expansion coefficient of $GeO_2$ increases and that of F decreases.

Figure 6:
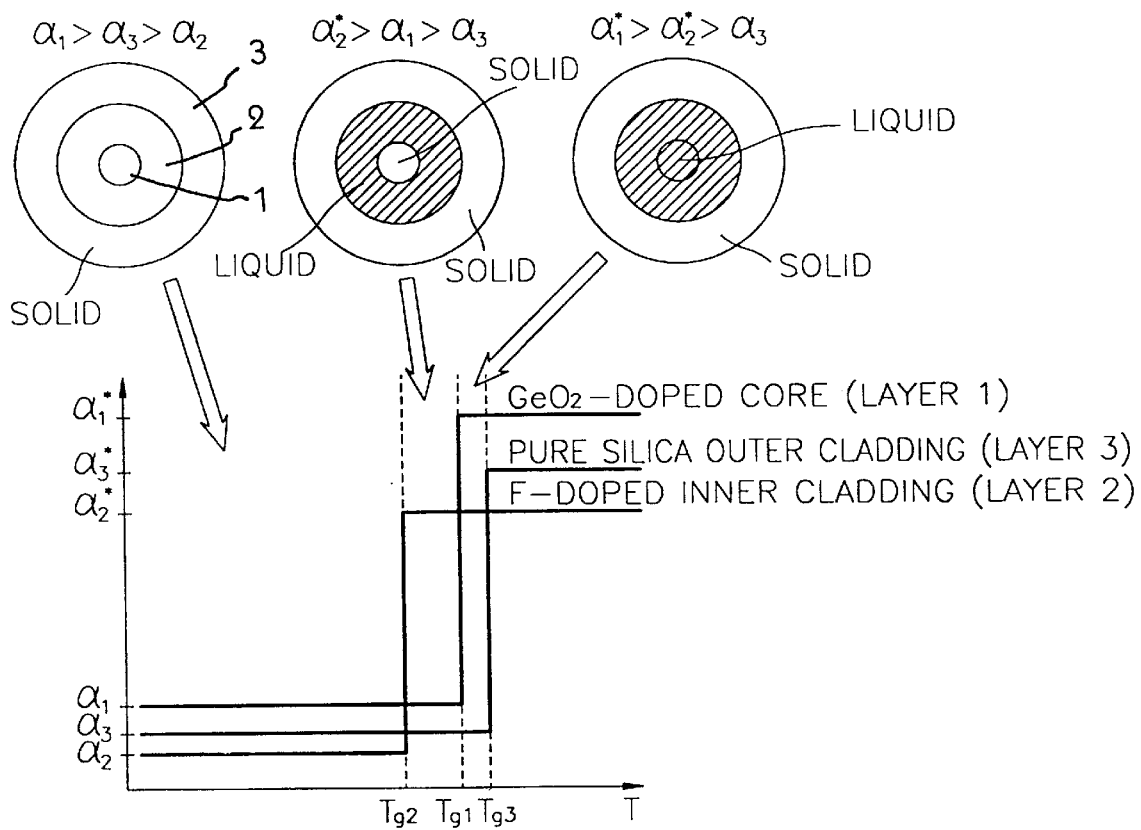
FIG. 6 illustrates the thermal expansion coefficients of glass in a solid state and in a liquid state, depending on the temperature of the glass.

FIG. 6 illustrates the thermal expansion coefficients of glasses as a function of the temperature of glass, over the range of solid and liquid states. Here, when the core, the inner cladding and the outer cladding are denoted by layers 1, 2 and 3, respectively, $\alpha_1$, $\alpha_2$ and $\alpha_3$ are thermal expansion coefficients of the layers 1, 2 and 3 in a solid glass state, $\alpha^*_1$, $\alpha^*_2$ and $\alpha^*_3$ are thermal expansion coefficients of the respective layers 1, 2 and 3 in a liquid glass state, and $T_{g1}$, $T_{g2}$ and $T_{g3}$ are glass transition temperatures of the respective layers 1, 2 and 3, which exist in three temperature ranges, that is, $T_{g1}<T<T_{g3}$, $T_{g2}<T<T_{g1}$, and $T<T_{g2}$.

Figure 7:
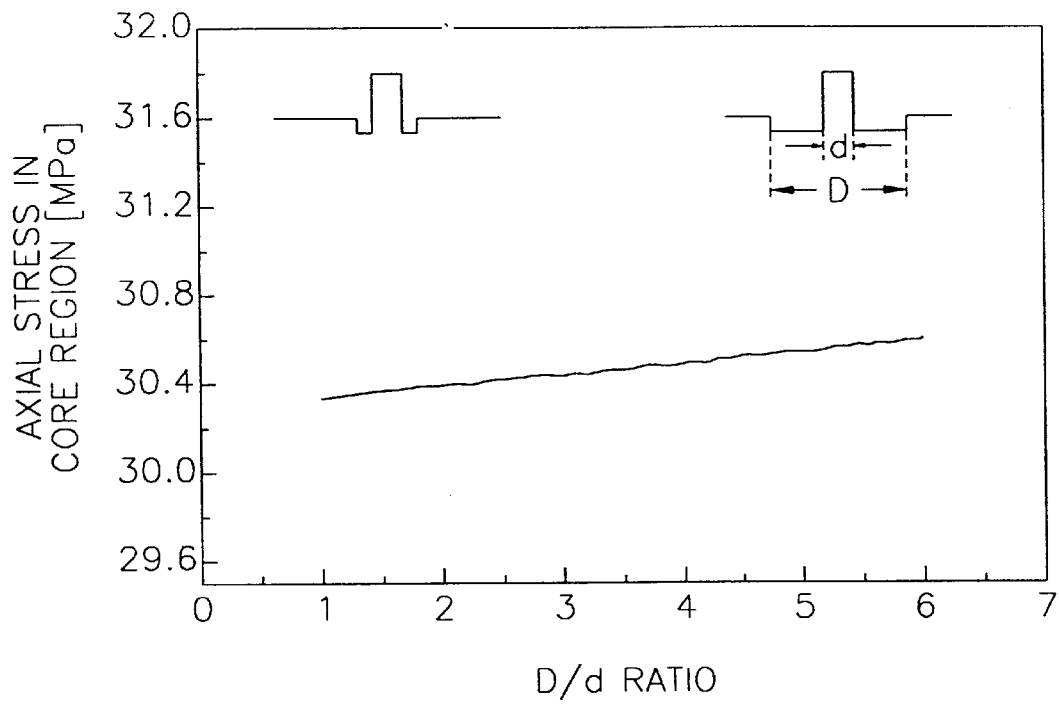
FIG. 7 illustrates axial thermal stress of a core, depending on the change in the ratio of the inner cladding diameter to the core diameter.

FIG. 7 illustrates axial stress of a core, depending on the change in the ratio of the inner cladding diameter to the core diameter. The insets illustrate the refractive index profiles for two different ratios. As shown in FIG. 7, even if the fiber is designed to give a different ratio of the inner cladding diameter (D) to a core diameter (d), D/d, little change in the axial stress of the core is observed.

Figure 8:
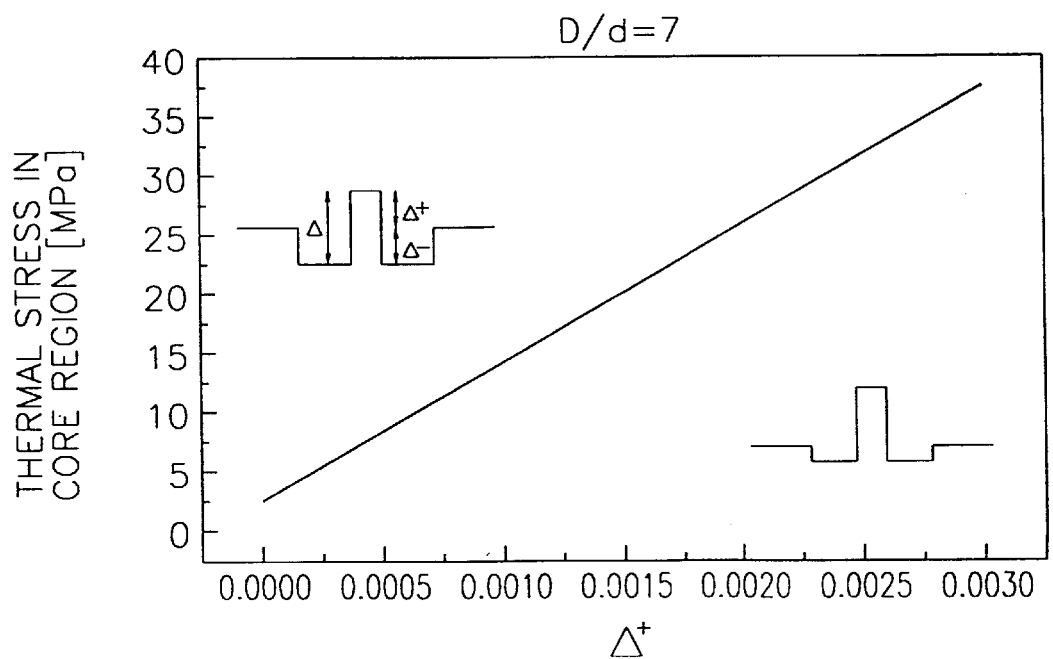
FIG. 8 illustrates thermal stress of a core, depending on the relative refractive index difference between the core and the outer cladding.

FIG. 8 illustrates thermal stress of a core, depending on the relative refractive index difference between the core and the outer cladding, $\alpha^+$. The insets illustrate the refractive index profiles for two examples. Here, $\alpha^+$ is obtained by dividing the difference obtained by subtracting the refractive index of the outer cladding from that of the core, by the refractive index of the outer cladding, that is, (core refractive index—outer cladding refractive index)/outer cladding refractive index. As shown in FIG. 8, when the relative refractive index difference between the core and the inner cladding, $\Delta$, is fixed to 0.0035 and the core diameter (d) is fixed, an increase in the refractive index of the core, that is, an increase in $\Delta^+$, causes a linear increase in thermal stress of the core, at a given ratio of D/d That is to say, the thermal stress depends only upon the refractive index of the core, rather than that of the inner cladding.

Figure 9:
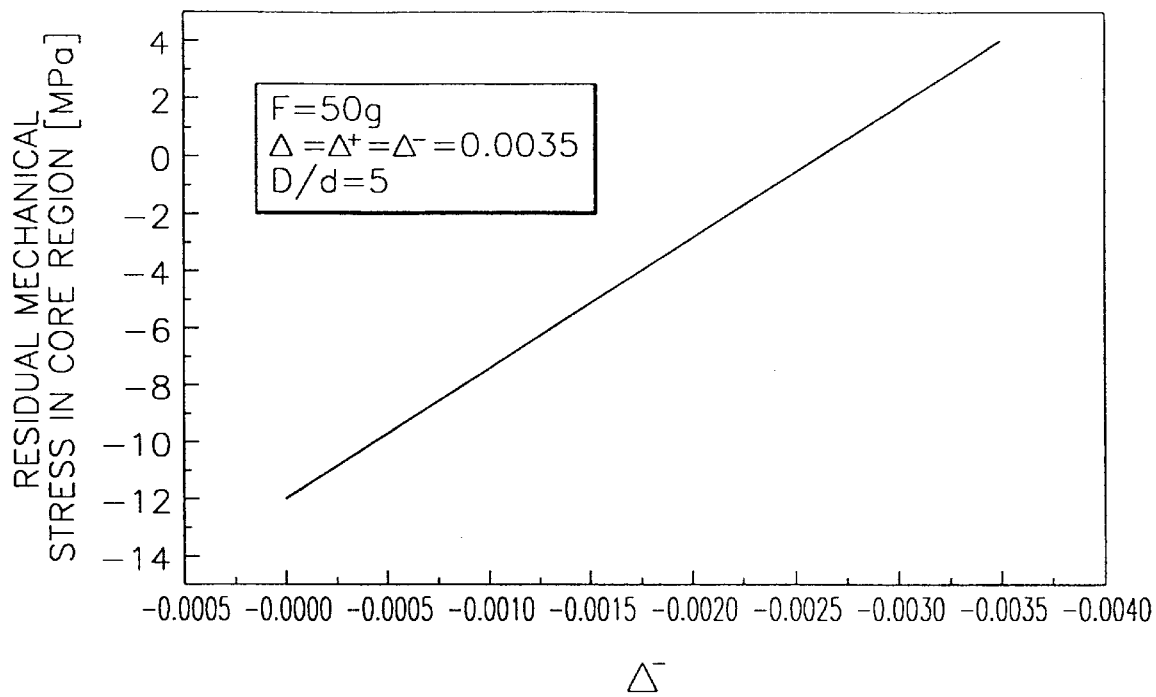
FIG. 9 illustrates residual mechanical stress of a core, depending on the relative refractive index difference between the inner cladding and the outer cladding.

FIG. 9 illustrates the residual mechanical stress of a core, depending on the relative refractive so index difference between the inner cladding and the outer cladding, $\Delta$. Here, $\Delta$ is obtained by dividing the difference obtained by subtracting the refractive index of the outer cladding from that of the inner cladding, by the refractive index of the outer cladding, that is, (core refractive index-outer cladding refractive index)/outer cladding refractive index. As shown in FIG. 9, when the value of $\Delta^-$ increases, that is, when the refractive index of the inner cladding increases, the stress is changed from compression to tension. In this case, if the amount of fluorine (F) increases, the refractive index of the inner cladding increases.

Figure 10:
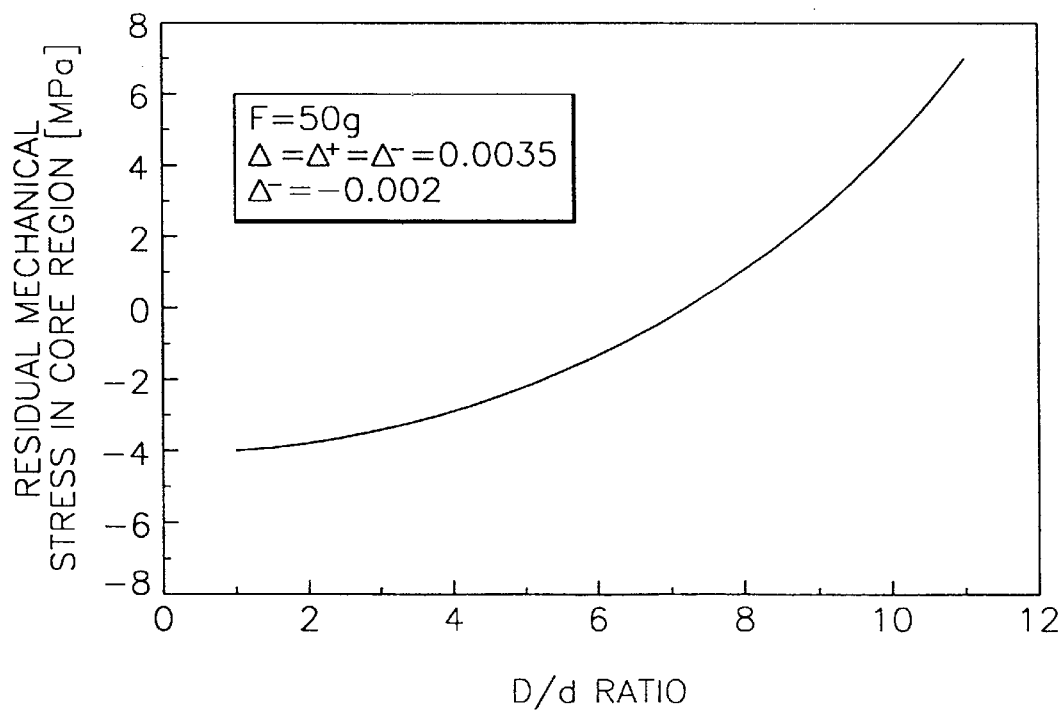
FIG. 10 illustrates the residual mechanical stress depending on a ratio of the inner cladding diameter to the core diameter.

FIG. 10 illustrates the dependence of the residual mechanical stress on the ratio of the inner cladding diameter to the core diameter, D/d. Referring to FIG. 10, if D/d increases, the residual mechanical stress is changed from compression to tension. In this case, if the thickness of an F-doped layer increases, D/d increases.

Therefore, according to the present invention, an optical fiber having desired characteristics can be fabricated by adjusting at least one of the above-described parameters, that is, the amount of F contained in the inner cladding 42, the thickness of the inner cladding 42, the amount of $GeO_2$ doped into the core 40, the composition of $SiO_2$ in the outer cladding 44 and the drawing tension of the optical fiber. By periodically annealing the multi-cladding optical fiber having the above-described configuration, a stress-released long-period optical fiber grating can be obtained.

Figure 11:
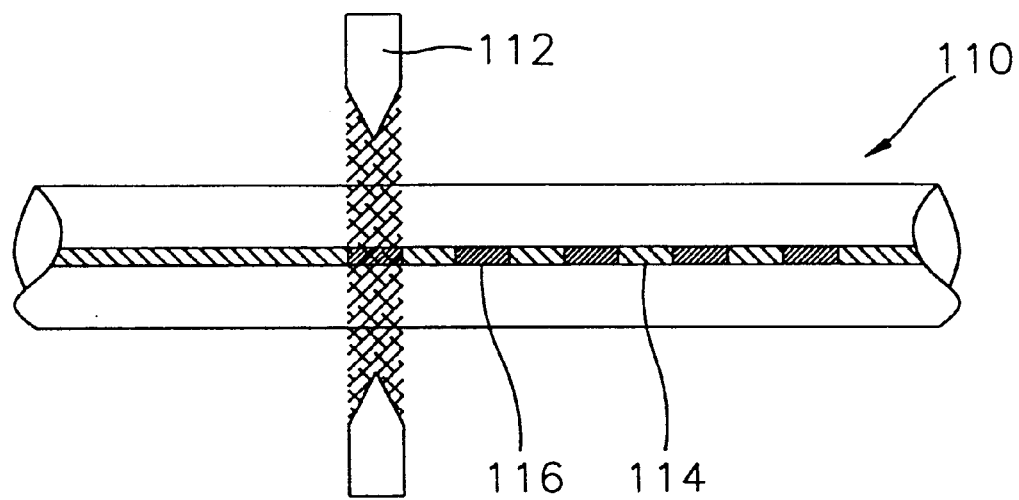
FIG. 11 is a diagram for explaining a method for writing a long-period optical fiber grating according to the present invention.

FIG. 11 is a diagram for illustrating a method for writing a long-period optical fiber grating on the above-described multi-cladding optical fiber, in which reference numeral 110 denotes a multi-cladding optical fiber according to the present invention, reference numeral 112 denotes annealing means, and reference numeral 114 is the core of the multi-cladding optical fiber 110.

Referring to FIG. 11, the method for writing the long-period optical fiber grating will be described. First, a multi-cladding optical fiber made of a material as described above, having a profile of refractive indices and having desired characteristics, is fabricated by adjusting the above-described parameters. The fabricated multi-cladding optical fiber 110 is step-by-step annealed to change the refractive index of the core 114. An arc discharge or a $CO_2$ laser irradiation can be employed as the annealing means 112. In FIG. 11, reference numeral 116 denotes a core having an increased refractive index, due to release of its residual stress by annealing the multi-cladding optical fiber 110 using the annealing means 112.

According to the present invention, it is possible to fabricate an optical fiber optimally suited to writing a long-period optical fiber grating therein. That is to say, an optical fiber having desired characteristics can be fabricated by adjusting parameters such as the amount of F, the thickness of an F-doped inner cladding, the amount of $GeO_2$ doped into a core, the composition of $SiO_2$ in an outer cladding and the drawing tension of the optical fiber. Also, the refractive index of the core of the optical fiber is periodically changed by periodically annealing the thus fabricated optical fiber, thereby writing a stress-released long-period optical fiber grating in the optical fiber.

What is claimed is:

1. An apparatus, comprising:
an annealed multi-cladding optical fiber, said multi-cladding optical fiber comprising:
a core including germanium-doped silica;
an inner cladding made of fluorine-doped silica surrounding said core, said inner cladding having a refractive index smaller than that of the core, compression stress being formed in said core and said inner cladding; and
an outer cladding comprising silica and surrounding said inner cladding, said outer cladding having a refractive index smaller than that of said core and larger than that of said inner cladding, tension stress being formed in said outer cladding, said annealed multi-cladding optical fiber having said compression and tension stresses released by a thermal annealing process using one selected from among a $CO_2$-laser and an electric arc.

2. The apparatus of claim 1, said inner cladding having a thermal expansion coefficient less than a thermal expansion coefficient of said outer cladding, said core having a thermal expansion coefficient greater than the thermal expansion coefficient of said outer cladding, when said inner cladding, said outer cladding, and said core are in a solid glass state.

3. The apparatus of claim 2, said outer cladding having a thermal expansion coefficient less than a thermal expansion coefficient of said core, said inner cladding having a thermal expansion coefficient greater than the thermal expansion coefficient of said core, when said core and said outer cladding are in the solid glass state and said inner cladding is in a liquid glass state.

4. The apparatus of claim 3, said outer cladding having a thermal expansion coefficient less than a thermal expansion coefficient of said inner cladding, said core having a thermal expansion coefficient greater than the thermal expansion coefficient of said inner cladding, when said core and said inner cladding are in the liquid glass state and said outer cladding is in the solid glass state.

5. The apparatus of claim 4, said inner cladding having a thermal expansion coefficient less than a thermal expansion coefficient of said outer cladding, said core having a thermal expansion coefficient greater than the thermal expansion coefficient of said outer cladding, when said core, said inner cladding, and said outer cladding are in the liquid glass state.

6. The apparatus of claim 5, said core having an axial stress increasing only slightly when a ratio of diameters increases substantially, said ratio of diameters corresponding to a ratio of diameter of said inner cladding to diameter of said core.

7. The apparatus of claim 6, an increase in refractive index of said core causes a linear increase in thermal stress of said core, when a relative refractive index difference between said core and said inner cladding is held constant, diameter of said core is held constant, and ratio of diameter of said inner cladding to diameter of said core is held constant.

8. The apparatus of claim 7, thermal stress of said core being dependent upon refractive index of said core and not upon refractive index of said inner cladding.

9. The apparatus of claim 8, residual mechanical stress of said core changing from compression to tension when refractive index of said inner cladding increases.

10. The apparatus of claim 9, refractive index of said inner cladding increasing when amount of fluorine in said inner cladding increases.

11. The apparatus of claim 10, residual mechanical stress of said core changing from compression to tension when ratio of diameters increases, said ratio of diameters corresponding to a ratio of diameter of said inner cladding to diameter of said core.

12. The apparatus of claim 11, thermal expansion coefficient of said core increasing and thermal expansion coefficient of said inner cladding decreasing, when concentrations of germanium in said core and fluorine in said inner cladding increase.

13. The apparatus of claim 12, said optical fiber being fabricated by adjusting at least one selected from among amount of fluorine in said inner cladding, diameter of said inner cladding, amount of germanium in said core, composition of silica in said outer cladding, and drawing tension of said optical fiber.

14. The apparatus of claim 13, said compression stress corresponding to a residual compression stress, said tension stress corresponding to a residual tension stress.

15. The apparatus of claim 14, said core having a refractive index increased due to release of residual stress of said core by said annealing.

16. The apparatus of claim 15, said optical fiber being annealed periodically to create a fiber grating.

17. The apparatus of claim 16, said optical fiber varying in refractive index along a length of the fiber.

18. The apparatus of claim 16, said optical fiber varying periodically in refractive index along a length of the fiber.

19. The apparatus of claim 18, said core not having photoreactive sites.

20. The apparatus of claim 19, said optical fiber not having photoreactive sites.

21. The apparatus of claim 20, said optical fiber not having $H_2$ injected into said optical fiber.

22. The apparatus of claim 21, said optical fiber not having refractive index of said optical fiber changed by ultraviolet radiation.

23. The apparatus of claim 22, said core not being doped with $N_2$.

24. The apparatus of claim 23, said apparatus corresponding to said multi-cladding optical fiber having a long-period optical fiber grating written in said multi-cladding optical fiber.

25. The apparatus of claim 24, said outer cladding comprising only silica.

26. The apparatus of claim 1, said outer cladding having a thermal expansion coefficient less than a thermal expansion coefficient of said inner cladding, said core having a thermal expansion coefficient greater than the thermal expansion coefficient of said inner cladding, when said core and said inner cladding are in a liquid glass state and said outer cladding is in a solid glass state.

27. The apparatus of claim 1, said outer cladding having a thermal expansion coefficient less than a thermal expansion coefficient of said core, said inner cladding having a thermal expansion coefficient greater than the thermal expansion coefficient of said core, when said core and said outer cladding are in a solid glass state and said inner cladding is in a liquid glass state.

28. The apparatus of claim 1, said core having an axial stress increasing only slightly when a ratio of diameters increases substantially, said ratio of diameters corresponding to a ratio of diameter of said inner cladding to diameter of said core.

29. The apparatus of claim 1, an increase in refractive index of said core causing a linear increase in thermal stress of said core, when a relative refractive index difference between said core and said inner cladding is held constant, diameter of said core is held constant, and ratio of diameter of said inner cladding to diameter of said core is held constant.

30. The apparatus of claim 1, said core having a thermal stress dependent upon refractive index of said core and not upon refractive index of said inner cladding.

31. The apparatus of claim 1, said core having a residual mechanical stress changing from compression to tension when refractive index of said inner cladding increases.

32. The apparatus of claim 1, said inner cladding having a refractive index increasing when amount of fluorine in said inner cladding increases.

33. The apparatus of claim 1, said core having a residual mechanical stress changing from compression to tension when ratio of diameters increases, said ratio of diameters corresponding to a ratio of diameter of said inner cladding to diameter of said core.

34. The apparatus of claim 1, thermal expansion coefficient of said core increasing and thermal expansion coefficient of said inner cladding decreasing, when concentrations of germanium in said core and fluorine in said inner cladding increase.

35. A method, comprising:
forming a multi-cladding optical fiber including a core made of germanium-doped silica, an inner cladding made of fluorine-doped silica surrounding said core, said inner cladding having a refractive index smaller than that of said core, and an outer cladding comprising silica and surrounding said inner cladding, said outer cladding having a refractive index smaller than that of said core and larger than that of said inner cladding; and
annealing a portion of said multi-cladding optical fiber, for changing refractive index of said core of the annealed portion, said annealing being performed by one selected from among irradiation with a $CO_2$ laser and treatment with an arc discharge.

36. The method of claim 35, further comprising:
adjusting amount of fluorine doped into said inner cladding, thickness of said inner cladding, amount of germanium doped into said core, composition of said outer cladding, and drawing tension of said fiber, for varying characteristics of said multi-cladding optical fiber.

37. The method of claim 36, said method corresponding to a method of manufacturing a long-period optical fiber grating in said multi-cladding optical fiber.

38. A method, comprising:
forming a core of germanium-doped silica,
forming an inner cladding of fluorine-doped silica surrounding said core, said inner cladding having a refractive index smaller than the refractive index of said core;
forming an outer cladding comprising silica surrounding said inner cladding, said outer cladding having a refractive index smaller than the refractive index of said core and larger than the refractive index of said inner cladding; and
when said core surrounded by said inner cladding surrounded by said outer cladding corresponds to a multi-cladding optical fiber, annealing said multi-cladding optical fiber, said annealing being performed by using one selected from among a $CO_2$-laser and an electric arc.

39. The method of claim 38, when said inner cladding, said outer cladding, and said core are in a solid glass state, said forming of said inner cladding corresponding to forming said inner cladding to have a thermal expansion coefficient less than a thermal expansion coefficient of said outer cladding, and said forming of said core corresponding to forming said core to have a thermal expansion coefficient greater than the thermal expansion coefficient of said outer cladding.

40. The method of claim 39, when said core and said outer cladding are in the solid glass state and said inner cladding is in a liquid glass state, said outer cladding having a thermal expansion coefficient less than a thermal expansion coefficient of said core, said inner cladding having a thermal expansion coefficient greater than the thermal expansion coefficient of said core,.

41. The method of claim 40, when said core and said inner cladding are in the liquid glass state and said outer cladding is in the solid glass state, said outer cladding having a thermal expansion coefficient less than a thermal expansion coefficient of said inner cladding, said core having a thermal expansion coefficient greater than the thermal expansion coefficient of said inner cladding.

42. The method of claim 41, when said core, said inner cladding, and said outer cladding are in the liquid glass state, said inner cladding having a thermal expansion coefficient less than a thermal expansion coefficient of said outer cladding, said core having a thermal expansion coefficient greater than the thermal expansion coefficient of said outer cladding.

43. The method of claim 42, said forming of said core being performed to form said core so that an axial stress of said core increases only slightly when a ratio of diameters increases substantially, said ratio of diameters corresponding to a ratio of diameter of said inner cladding to diameter of said core.

44. The method of claim 43, said forming of said core being performed to form said core so that an increase in refractive index of said core causes a linear increase in thermal stress of said core, when a relative refractive index difference between said core and said inner cladding is held constant, diameter of said core is held constant, and ratio of diameter of said inner cladding to diameter of said core is held constant.

45. The method of claim 44, said forming of said core being performed to form said core so that thermal stress of said core is dependent upon refractive index of said core and not upon refractive index of said inner cladding.

46. The method of claim 45, said forming of said core being performed to form said core so that residual mechanical stress of said core changes from compression to tension when refractive index of said inner cladding increases.

47. The method of claim 46, said forming of said inner cladding being performed to form said inner cladding so that refractive index of said inner cladding increases when amount of fluorine in said inner cladding increases.

48. The method of claim 47, said forming of said core being performed to form said core so that residual mechanical stress of said core changes from compression to tension when ratio of diameters increases, said ratio of diameters corresponding to a ratio of diameter of said inner cladding to diameter of said core, said forming of said core being performed to form said core so that thermal expansion coefficient of said core increases and thermal expansion coefficient of said inner cladding decreases, when concentrations of germanium in said core and fluorine in said inner cladding increase.

49. The method of claim 48, further comprising:
fabricating said optical fiber by adjusting at least one selected from among amount of fluorine in said inner cladding, diameter of said inner cladding, amount of germanium in said core, composition of silica in said outer cladding, and drawing tension of said optical fiber.

50. The method of claim 49, further comprising:
forming residual compression stress in said core and said inner cladding;

forming residual tension stress in said outer cladding; and releasing said compression and tension stresses by said annealing.

51. The method of claim 50, said core and said inner cladding having a relatively low viscosity, said outer cladding having a relatively high viscosity.

52. The method of claim 50, said forming of said core being performed to form said core so that refractive index of said core increases due to release of residual stress of said core by said annealing.

53. The method of claim 52, said annealing corresponding to periodically annealing said optical fiber to create a fiber grating.

54. The method of claim 53, said forming being performed so that said optical fiber varies in refractive index along a length of said optical fiber.

55. The method of claim 53, said forming being performed so that said optical fiber varies periodically in refractive index along a length of said optical fiber.

56. The method of claim 55, said forming of said core being performed to form said core so that said core does not have photoreactive sites.

57. The method of claim 56, said forming being performed so that said optical fiber does not have photoreactive sites.

58. The method of claim 57, said forming being performed so that said optical fiber does not have $H_2$ injected into said optical fiber.

59. The method of claim 58, said forming being performed so that said optical fiber does not have refractive index changed by ultraviolet radiation.

60. The method of claim 59, said forming of said core not including doping said core with $N_2$.

61. The method of claim 60, said method corresponding to forming said multi-cladding optical fiber having a long-period optical fiber grating written in said multi-cladding optical fiber.

62. The method of claim 61, said for of said outer cladding being performed so that said outer cladding comprises only silica.

63. The method of claim 38, when said core and said inner cladding are in a liquid glass state and said outer cladding is in a sold glass state, said outer cladding having a thermal expansion coefficient less than a thermal expansion coefficient of said inner cladding, said core having a thermal expansion coefficient greater than the thermal expansion coefficient of said inner cladding.

64. The method of claim 38, when said core and said outer cladding are in a solid glass state and said inner cladding is in a liquid glass state, said outer cladding having a thermal expansion coefficient less than a thermal expansion coefficient of said core, said inner cladding having a thermal expansion coefficient greater than the thermal expansion coefficient of said core.

65. The method of claim 38, said forming of said core being performed to form said core having an axial stress increasing only slightly when a ratio of diameters increases substantially, said ratio of diameters corresponding to a ratio of diameter of said inner cladding to diameter of said core.

66. The method of claim 38, said forming of said core being performed to form said core so that an increase in refractive index of said core causes a linear increase in thermal stress of said core, when a relative refractive index difference between said core and said inner cladding is held constant, diameter of said core is held constant, and ratio of diameter of said inner cladding to diameter of said core is held constant.

67. The method of claim 38, said forming of said core being performed to form said core so that a thermal stress of said core is dependent upon refractive index of said core and not upon refractive index of said inner cladding.

68. The method of claim 38, said forming of said core being performed to form said core so that a residual mechanical stress of said core changes from compression to tension when refractive index of said inner cladding increases.

69. The method of claim 38, said forming of said inner cladding being performed to form said inner cladding so that a refractive index of said inner cladding increases when amount of fluorine in said inner cladding increases.

70. The method of claim 38, said forming of said core being performed to form said core so that a residual mechanical stress of said core changes from compression to tension when ratio of diameters increases, said ratio of diameters corresponding to a ratio of diameter of said inner cladding to diameter of said core.

71. The method of claim 38, said forming of said core being performed to form said core so that a thermal expansion coefficient of said core increases and thermal expansion coefficient of said inner cladding decreases, when concentrations of germanium in said core and fluorine in said inner cladding increase.

\* \* \* \* \*